United States Patent [19]

McClure et al.

[11] 4,425,736
[45] Jan. 17, 1984

[54] HERBICIDE APPLICATOR AND WELDED ENDLESS ROPE

[76] Inventors: Leon E. McClure, R.R. #2 Box 78; Stanley R. McClure, Sr., R.R. #2 Box 161, both of Jamestown, Ky. 42629

[21] Appl. No.: 359,867

[22] Filed: Mar. 19, 1982

Related U.S. Application Data

[63] Continuation-in-part of Ser. No. 177,166, Aug. 18, 1980, Pat. No. 4,320,595.

[51] Int. Cl.³ ............................................. A01M 21/00
[52] U.S. Cl. ...................................... 47/1.5; 428/188; 428/198
[58] Field of Search .................. 428/188, 198; 47/1.5; 156/158, 292; 264/249

[56] References Cited

U.S. PATENT DOCUMENTS

2,466,951  4/1949  Hunter ........................... 156/158 X
4,320,595  3/1982  McClure et al. ...................... 47/1.5

Primary Examiner—Robert E. Bagwill
Attorney, Agent, or Firm—Wm. R. Price

[57] ABSTRACT

The apparatus includes an endless rope trained over two distally mounted sheaves which define paths spanning either side of said sheaves and means for the continuous application of herbicide to the endless rope. The means for applying herbicide to the rope includes an immersion basin in which portions of the rope are continually pulled through a bath of liquid herbicide. The endless rope is fabricated of synthetic polymeric material, such as nylon, and is made by applying heat to the two free ends until the polymeric material melts and the two free ends are then welded together. Since the endless rope is under some tension, as it traverses the path defined at each end by the sheaves, a second endless rope is tack-welded to the edge of the drive rope at spaced intervals of 1 to 3 inches, again by application of heat to the outer surfaces of the two ropes at the point of contact until the polymeric material is melted to the extent required for welding the two ropes together. In this manner, the second rope is under no tension and therefore can carry herbicide on its outer surface for application to weeds through wiping engagement. The distally mounted sheaves are journalled at the end of a boom which extends transversely of a frame work installed onto a tractor and which has height adjustment means allowing the boom and the endless rope trained thereon to be raised or lowered so that the wetted rope wipingly engages the weeds but does not engage the crop.

15 Claims, 9 Drawing Figures

HERBICIDE APPLICATOR AND WELDED ENDLESS ROPE

REFERENCE TO RELATED APPLICATION

This application is a continuation in part of our copending application, Ser. No. 177,666, for Herbicide Applicator, filed Aug. 18, 1980, now U.S. Pat. No. 4,320,595, dated Mar. 23, 1982.

BACKGROUND OF THE INVENTION

This invention relates to a unique apparatus for applying chemicals to plants and specifically for selectively applying herbicide to plants without applying said herbicide to the crops.

Certain non-selective herbicides have been introduced onto the market which are capable of killing virtually any plant with which they come into contact by the application of very small amounts of herbicide to a small area of foliage. Such herbicides are presently being used extensively to kill undesirable vegetation such as Johnson Grass, which heretofore has been virtually uncontrollable. Weeds such as Johnson Grass normally grow to heights far in excess of the desirable crops at least in the early stages.

FIELD OF THE INVENTION

This invention relates to apparatus for selectively applying herbicide or other chemicals to weeds through wiping engagement of the herbicide onto the weed foliage. An object of the invention is to apply the herbicide in such a manner that it is applied only to the weeds normally of a height greater than the crop, selectively so that there is no loss or undesirable spillage of the herbicide onto the crop or onto the soil in which the crops are grown. The apparatus for achieving this object involves the use of an endless rope trained over distally located sheaves journalled on a laterally extending boom. This invention relates to the method of forming the endless rope and a method for increasing the rope's carrying capacity of herbicide through the provision of a second endless rope tack-welded to the first endless rope at spaced intervals. An object of this invention, then, is two endless ropes, welded together at their respective ends, and welded to each other at spaced intervals so that the outer of the two endless ropes is under no tension, but will be driven by the inner endless rope, through the path defined by the distally located sheaves.

DESCRIPTION OF THE PRIOR ART

According to the prior art, various selective herbicides have been employed in which the herbicides are applied directly both to the crop and to the undesirable vegetation. This is, however, economically unsatisfactory in that a much greater amount of herbicide is used than is necessary and involves certain environmental problems by applying the herbicide to the soil surrounding the crop and in applying the herbicide to the crop itself. With the advent of certain very powerful non-selective herbicides, which will kill plants by application of only a small amount to the foliage of weeds, or indeed, to anything else they touch, it has become necessary to device apparatus which will apply the herbicide only to the weeds and not to the desirable plants. Thus, for example, there have been devised certain recirculating type sprayers such as those disclosed by John O. Moore and Ray H. Dawson in U.S. Pat. No. 4,168,790 and J. W. Thomason in U.S. Pat. No. 3,584,787. These techniques involve the spraying of the non-selective herbicides to weeds taller than the crop whereby the herbicide is sprayed above the level of the cultivated crop to contact the portions of the weeds which have grown higher, and in which the excess weed killer is collected in a recovery receptacle and recycled back to the sprayer. While such systems are available and have been used satisfactorily, and have applied the weed killer primarily to the weeds without application to the cultivated crop, the equipment is quite expensive. Clogging of the recirculation system sometimes occurs and during unfavorable wind conditions much of the sprayed weed killer is deflected from the target plant and hits the crop surrounding same. One answer to this problem has been proposed by James A. McKirdy in U.S. Pat. No. 4,019,278 who provides a weed bar through which the herbicide is circulated and which permeates the weed bar so as to wipingly engage with the weeds that come into contact with it. The weed bar is pulled around behind the tractor, and the whole assembly is held at an elevation or height so that only the weeds are contacted and the shorter crops do not come into contact therewith. Still another proposal has been made by James H. Roberson in U.S. Pat. No. 4,187,638 in which elongated polyvinylchloride pipes, contain herbicide and have extending therethrough wick like materials fabricated preferably of nylon rope for engagement with the weeds. The herbicide moves by capillary action from the pipe containing the herbicide and again wipingly engages the wetted rope with the tall weeds extending above the desired plants. There have been certain difficulties encountered with such apparatus, such as breakage of the pipe through engagement with rocks or stumps, difficulties in maintaining the exposed wick portions sufficiently wet for application of the herbicide, and leakage around the apertures through which the nylon ropes are braided.

SUMMARY OF THE INVENTION

According to this invention, an endless rope, fabricated of polymeric material such as nylon, is constantly immersed in a shallow level of herbicide contained in an immersion basin and thereafter trained over and around two distally mounted sheaves, at opposite ends of an elongated boom. The boom is held at the proper elevation so that the wetted rope moving along on either side of the boom engages only the undesirable weeds. The endless rope is prepared by heating the free ends of the rope until the polymeric material reaches a fusion temperature and thereafter pushing the two ends together so as to form a weldment of the melted materials. This may be accomplished by the use of any relatively flat, hot surface, such as a soldering iron, and the two free ends are held on either side of the iron until fusion temperature is reached, at which time the iron is removed and the two ends pushed together so that the melted portions may mix with each other and form a solid weld. Additionally, in order to increase the carrying capacity of the rope trained over the distally mounted sheaves, a second rope is tack-welded to the outer surface of the inner rope, again by the application of heat to the external surfaces of the rope until fusion temperature is reached and the two surfaces can be pushed together. This again, may be accomplished by use of a soldering iron or by use of a flat-surfaced object such as a putty knife heated to the proper temperature. The second rope, is tack-welded at selected intervals of 1 to several inches so that the second rope is not under any tension and is driven by the first rope along the path defined by the sheaves.

DESCRIPTION OF THE PREFERRED EMBODIMENT

Referring now to the specification, the device of this invention is designed for selectively applying herbicide through wiping engagement to vertically standing weeds. One of the most offensive weeds with which farmers have had to control, is Johnson Grass. This weed grows very tall, and involves a network of rhizome root connections underground which makes the weed practically impossible to control by standard methods. The rhizome networks involve a horizontally dispersed group of root like growths which differ, however, from roots in being able to establish reserve deposits of nutriment, nodes and buds, and which are capable of establishing a separate and independent root system and a separate and independent sprouting system. Thus, even if the parent plant were dug completely up including the parent root system, the plant would not die because of the accessory root system and accessory sprouting systems provided by the horizontally disposed rhizome network in all directions. Because of of this weed, many of the bottom land farms in the Mississippi and the Ohio Valley had been all but given up for lost due to Johnson Grass.

Recently, however, there has been introduced onto the market certain non-selective herbicides, such as one sold by Monsanto Chemical under the names ROUNDUP*, which if wiped onto a small area of the foliage will completely kill the plant including the root and rhizome systems. Unfortunately, the herbicide is nonselective and will also kill other plants. Nevertheless, because of the characteristics of Johnson Grass and most other noxious weeds, the weeds attain quick initial growth before the crop has achieved the same height. Thus, it is possible to apply the herbicide onto the noxious weeds through wiping engagement without touching the shorter crops.

*Registered trademark of Monsanto Chemical Co. for the isopropylamine salt of glyphosphate in which the active ingredient is N-phosphous-methyl glycine.

Another factor which adds to the desirability of selectivity of the applicator is the cost of the herbicide itself. Under present conditions ROUNDUP sells for about $60 to $70 per gallon. Since ROUNDUP is mixed with water, at a ratio of about 1:3, the finished solution costs in excess of $15.00 per gallon. Therefore, it is incumbent upon the farmer to see both that the herbicide is not applied to the expensive crop, and that the herbicide itself is not wasted.

Figure 1:
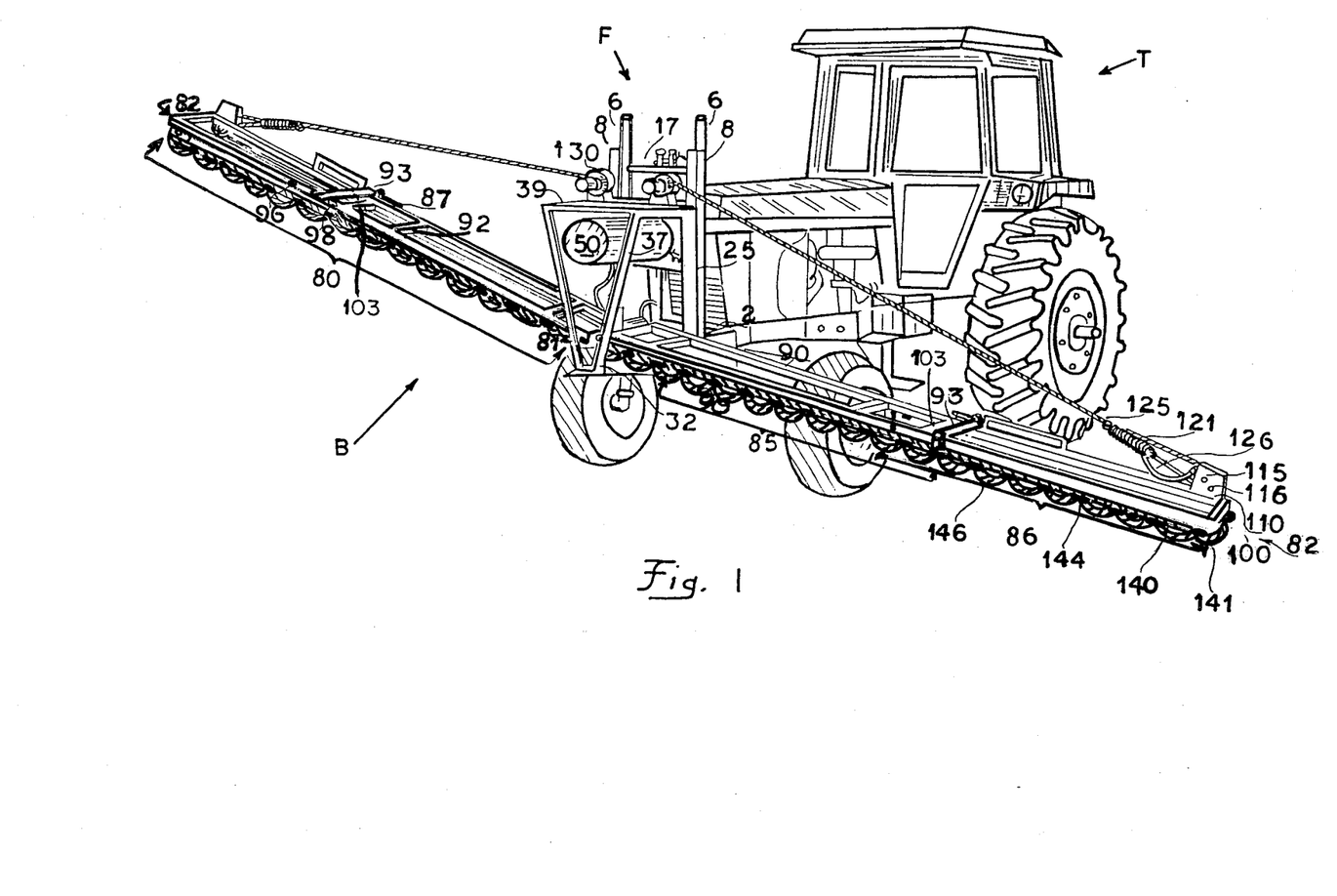
FIG. 1 is a view in perspective with parts not shown for purposes of illustration and which illustrates the boom of this invention mounted on the tractor with one section of said boom lowered and with one section of the boom raised.
Figure 3:
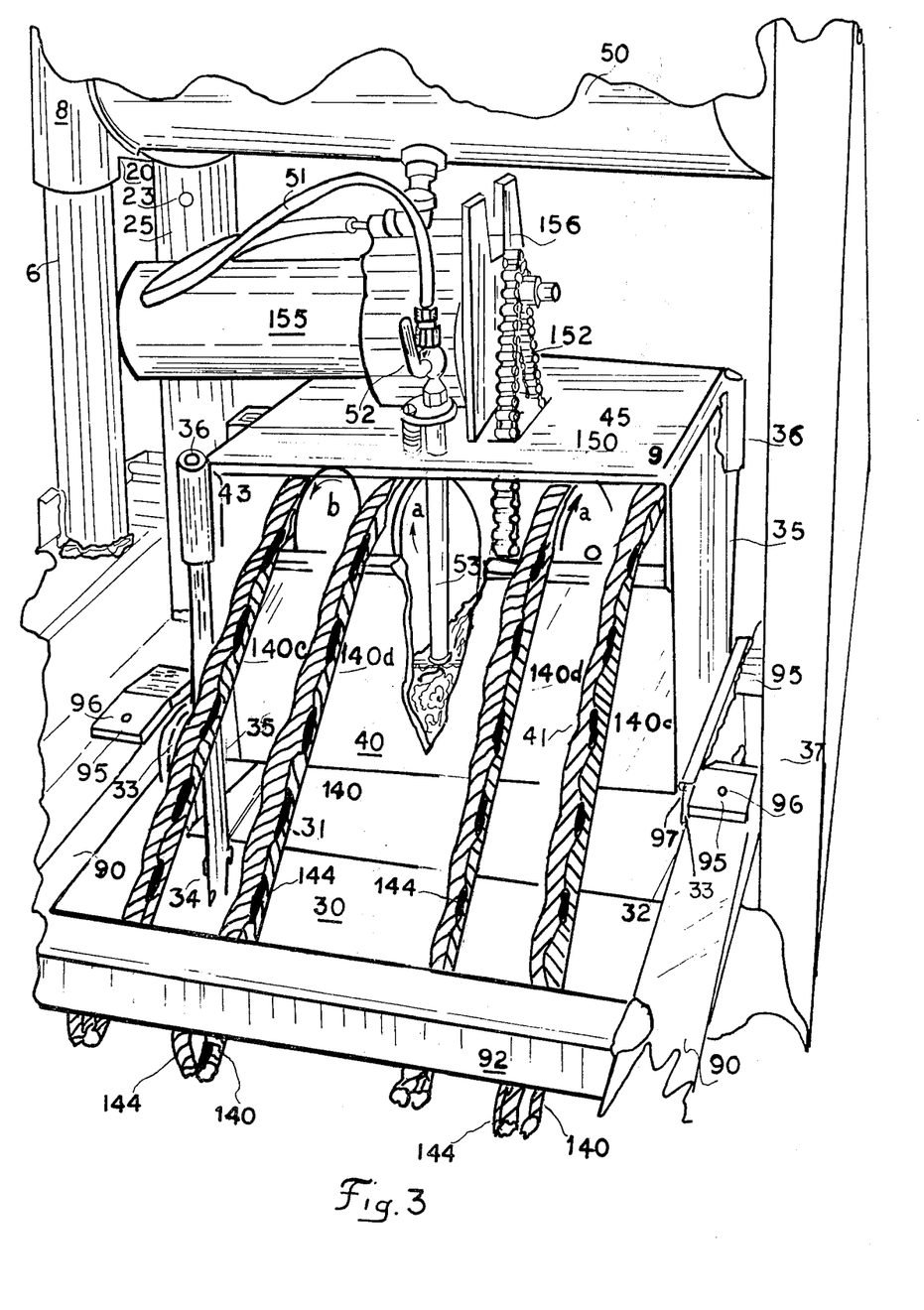
FIG. 3 is an enlarged fragmentary view, in perspective, illustrating the drive means for the drums and their relation to the immersion basin and the relationship of the reserve tank thereto.

Referring now to the drawings, the herbicide applicator consists basically of three parts. The applicator itself consists of a frame work F mounted upon a tractor T and includes a laterally extending boom B. Referring now to FIG. 1 and FIG. 3, the frame work F is attached to the tractor T by means of side support members bolted to the chassis of the tractor. Attached to the bottom support member is a vertical round stationary post 6. A sleeve 8 surrounds said stationary support and is moved by means of hydraulic cylinder (not shown). The power to the hydraulic cylinder supplied through the hydraulic line from the tractor. As best can be seen in FIG. 3, the vertical support member has attached thereto two side steel plates 30 forming the side walls of a support frame, a steel beam 31 forming the back of said frame and a steel plate 32 forming the front cross piece of the frame. A mounting plate 33 is attached to the front cross piece 32 and rear cross piece 31, respectively, as a mounting means for the pivot pin 97 of the boom. A support rod 35 is welded at point 34 to the side steel plate 30 and is equipped with a sleeve 36 which is for the support of the immersion basin 40. The immersion basin 40 consists basically of side wall 41, front wall 42 and rear wall 43 and top cover 45.

The reserve tank 50, as is best seen in FIG. 1 and FIG. 3, is connected via liquid conduit 51 to the inlet tube 53 leading to the immersion basin 40. The immersion basin 40 in FIG. 3 is shown in the raised position for the application of the endless ropes 140 and 141 to the drive drum and the idler drums b. Normally, the immersion basin 40 will be located at a lower level so that the drive rope sections 140c and d would be below the cross piece 92 and would not rub against the lower portion thereof. A simple valve 52 is interconnected between the liquid conduit 51 and the inlet tube 53 which tube extends down into the immersion basin 40 and has a restricted orifice at point 54. A float valve 60 of special design is supported by a L shaped stationary support and has a vertical leg 55 welded at a point 57 to the bottom of the basin 40 and a short leg 56 supporting the inlet tube 53 of the liquid conduit 51. The float valve consists of a hinge in which the short leaf 61 is attached to the vertical leg 55 of the L shaped member by means of bolt 62 and a free swinging leaf 63 attached by hinge pin 64. The free swinging leaf 63 contains a resilient rubber pad 65 which acts as the valve member when it is in engagement with the restricted orifice 54 of the inlet tube 53. A cork 66 or other float located at the end of the free swinging leaf holds the pad in closed position. As the level 70 of the liquid herbicide recedes, however, the leaf lowers thus allowing a flow of liquid into the immersion basin 40.

Because of the fact that the liquid immersion basin is on a tractor moving across a cultivated field, and is subjected to jolts and jars, the liquid level of the herbicide is purposely kept shallow. This is to prevent sloshing of the liquid out of the immersion basin 40. Additionally, the walls of the immersion basin are relatively tall to minimize or prevent any loss of the valuable liquid herbicide through sloshing or splashing. As previously has been mentioned, connected to the bottom front steel plate 32 is a pair of front diagonally disposed struts 37, corresponding to some extent to the vertical support post 25 in the rear. A top plate 39 is attached as by welding to the front diagonally disposed struts 37 and the rear support posts 25. A triangular projecting metal rod 47 attached to the base of the front disposed struts 37 forms a triangular projecting weed bender for bending weeds in the exact center of the structure laterally into engagement with the herbicide applicator as will be more fully set forth later.

Referring now to the boom section B of the apparatus, the boom consists of two sections 80 each having a medial end 81 and a distal end 82. In a preferred embodiment each section of the beam consists of a medial portion 85 and a distal portion 86.

The medial portion 85 consists of tubular steel side supports 90 and tubular steel cross pieces 91 and 92. At the distal end 81 of the medial portion 85 there is a break away clip containing a vertical shear pin 96. The break away clip provides a pivot point for medial end 81 through the provision of pivot pin for the boom B. At the distal end of the medial portion there is another pivot point, i.e. pin 98 wherein the distal portion of the boom 86 is pivotably attached to the medial portion 81. However, as can be seen in FIG. 1 when the distal portion 86 is in extended position with the medial portion 85, they can be locked into position by means of a conventional door slide bolt or other locking members 87 shown mounted axially on tubular side steel supports 90. It is, of course, possible to use other means of locking the two steel pieces together, however, the conventional door slide bolt 87 works very well without danger of damaging the tubular steel members.

Figure 4:
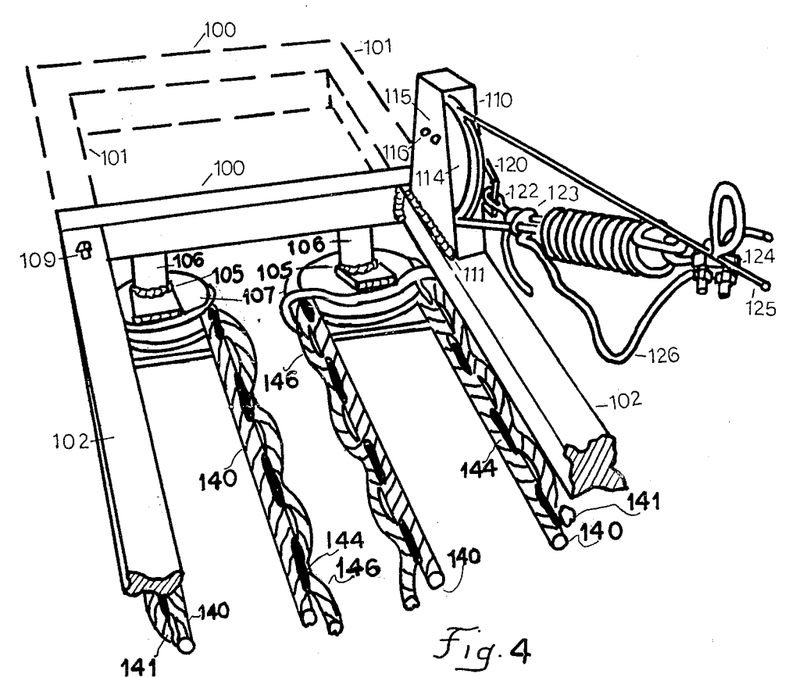
FIG. 4 is an enlarged fragmentary view in perspective of the wetted endless rope trained over the distally mounted sheaves at one end of the boom and the coil spring snubber attached to the end of the cable for absorbing vibrations and for supporting the end of the boom.
Figure 5:
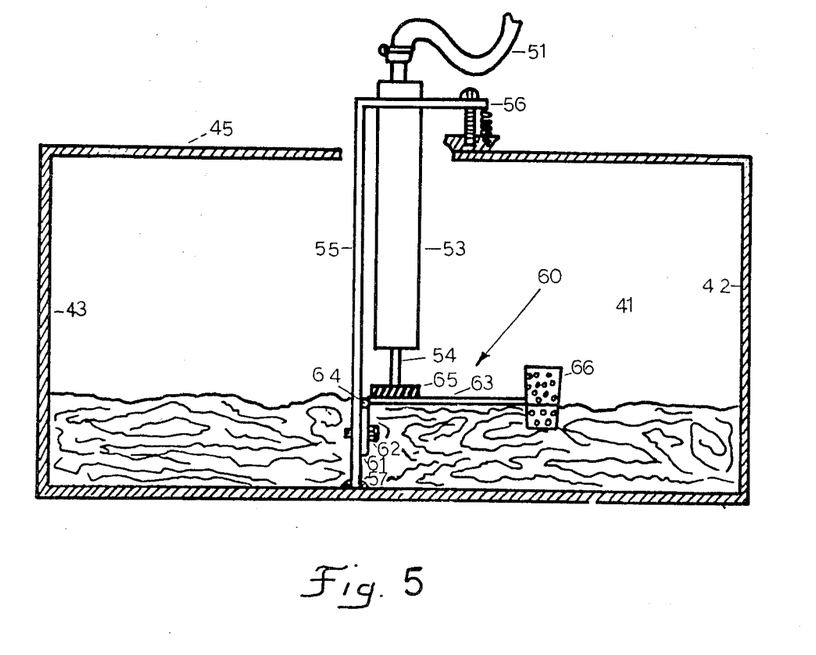
FIG. 5 is a sectional view of the immersion basin in which the drive drums have been removed for purposes of illustration and which illustrates the feed tube for the liquid herbicide, in combination with the float valve and the shallow liquid level of herbicide in said basin.

As can be seen by reference to FIGS. 1 and 4, the distal portion 86 of the boom B consists of tubular side members 102 and tubular cross pieces 103. A tubular piece 100 at the end acts as a support for the distally mounted sheaves 107 as will be described later. However, the end piece 100 is attached to a smaller telescopic tubular side member 101 which slides into the tubular side member 102 and is held into position by means of set screw 109. This is for the purpose of adjusting the tension of the drive rope 140 and second rope 141 forming the herbicide applicators. The sheaves 107 are attached through axle housing 106 and by weld 105.

The boom is supported by means of a cable 125 looped around a dead sheave 114 set in dead sheave housing 110 which is welded to the tubular steel support member 102 by means of weld 111. The cable is attached at its free end to the end of spring 121 which in turn is connected back to the body of the cable 125. The coil spring 121 maintains the tension of the cable loop in the groove of the immovable sheave. Thus, when the device runs into a large hole, the boom will drop suddenly and will be pulled back into position by the spring, which will then apply sufficient tension onto the groove of sheave 114 through the cable loop to quickly dampen or snub the vibrations and bring the boom back into equilibrium without undue oscillation. Bolts 115 and 116 hold the sheave 114 in fixed or dead position. A flange 120 projects from dead sheave housing 110 and is attached by means of harness snap 122 to an anchoring plate 123 which attaches both to the coil spring 121 and the end of the cable 125. The cable, however, is again looped to form a safety loop 126 and joined to a split clevis 124 attached again to the supporting cable 125. This second connection acts as a safety support in the event that the coil spring breaks or otherwise comes loose so that the boom does not drop all the way to the ground.

The cables as is shown in FIG. 1 are wound arund cable drums 130 controlled by a pair of motors (not shown.) Therefore, as is shown in FIG. 1 the boom can be raised vertically or it can be raised 45° or it can be lowered, as is shown in FIG. 1, almost to the ground. This allows for the tractor operator to raise the boom sections without completely disassembling same in order to go through gates or to lower portions to go beneath overhanging branches or the like.

However, in order to move the apparatus on the highways or through narrow gates, the boom can be folded up for transportation through gates or on highways or the like.

Figure 2:
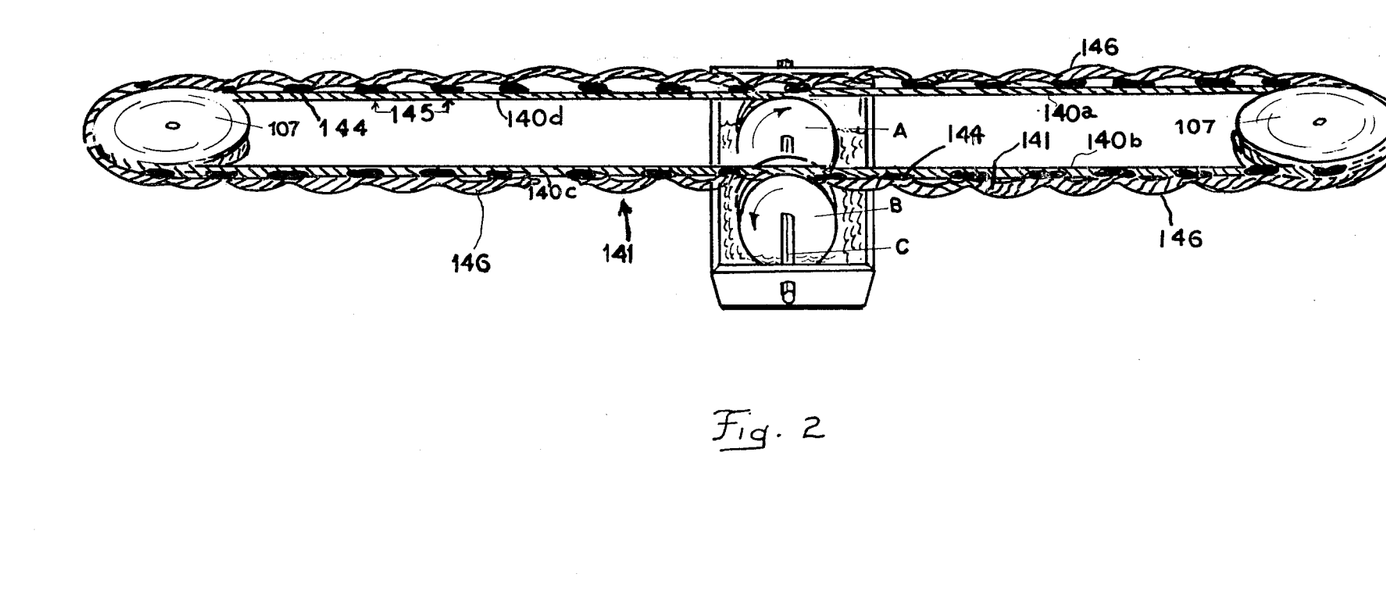
FIG. 2 is a partially diagrammatic illustration which illustrates the drive drum and the idler drum of this invention and the two endless ropes tack welded to each other and trained over the distally mounted sheaves and which illustrates further the two tack welded endless ropes wrapped around said drums, said medially mounted drums being journalled so that the bottom portions are immersed below the liquid level of the herbicide within the basin.

The real heart of the apparatus however, lies in the endless rope 140 and 141, which is diagrammatically shown in FIG. 2. The ropes are looped in one full revolution around the drive drum A and thence through the end of the distally mounted sheaves 107 and return in the opposite direction to the idler drum B. It will be noted that the ropes completely loop both of the drums so that driving the axle C of drum A the drive drum A will drive the rope 140a around sheave 107 and back in section 140b around the idler drum B out through 140c around 107 and back through 140d to the drive drum A. It will be noted that the direction of the revolution of drive drum A is the opposite of the direction of revolution of idler drum B.

Figures 6, 7:
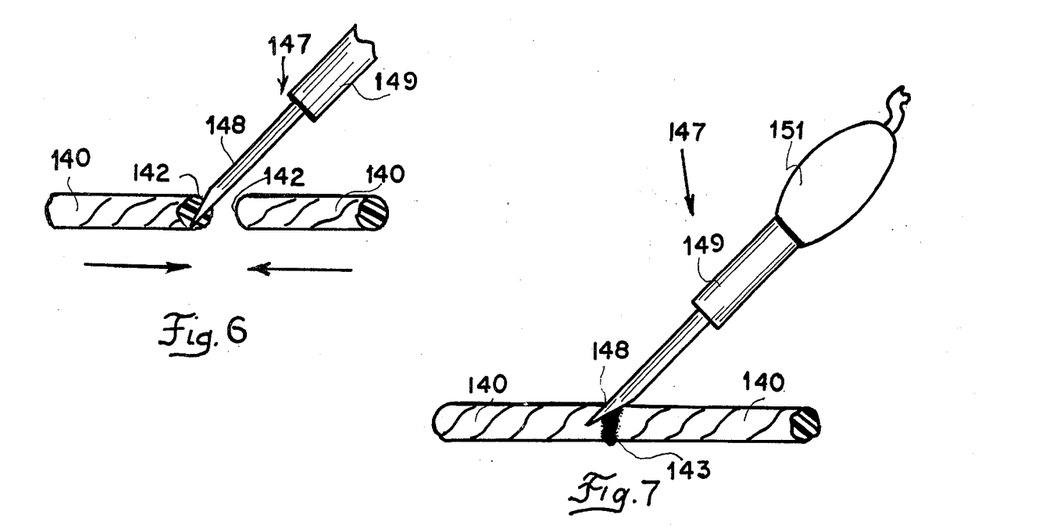
FIG. 6 is a view in perspective illustrating the method of welding the free ends of the polymeric rope together by application of heat thereto.
FIG. 7 is a view illustrating the heat source in the form of a soldering iron being removed from the two ends of rope and the formation of the weld.

The endless ropes 140 or 141 are formed by melting the free ends 142 of the ropes by application of heat applied thereto as for example with a soldering iron 147. The soldering iron 147 has a handle 151 which insulates the electric heating coil 149 from the person using it. Heating coil 149 heats the element 148. As the rope ends 142 reach fusion temperature, the heating element 148 of soldering iron 147 is removed and the two ends 142 are pushed together to form a weld 143.

Figure 8:
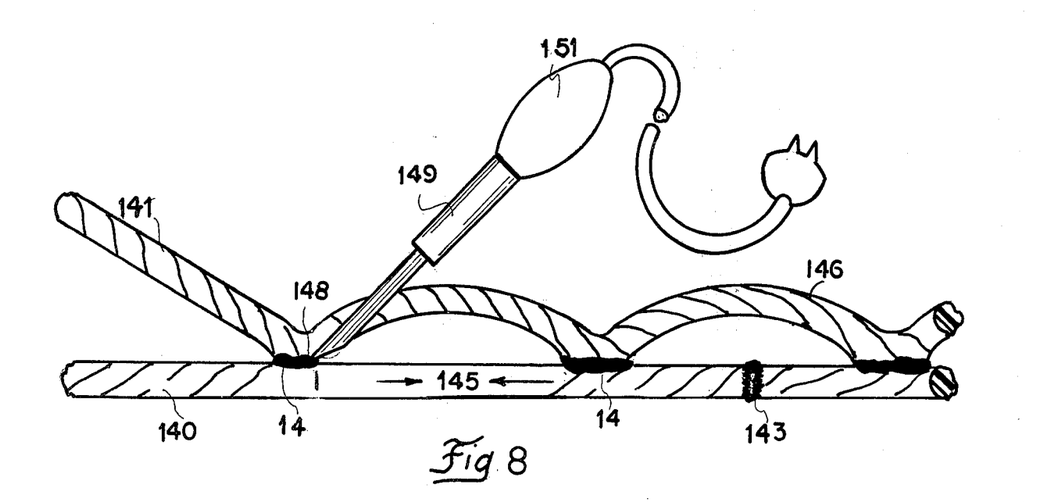
FIG. 8 is a view in elevation illustrating the use of the soldering iron in tack welding the second rope piece to the first rope piece.
Figure 9:
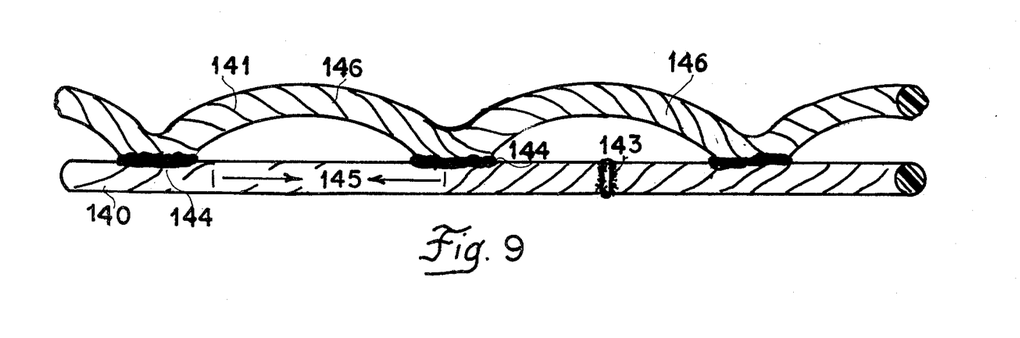
FIG. 9 is a side elevation illustrating the second rope tack welded to the drive rope at spaced intervals.

The second rope is designed to be under absolutely no tension so as to increase the carrying capacity of the ropes 141 and 142. This is accomplished by tack welding the surface of rope 141 to the external surface of rope 140 at spaced points 145 between the welds of from 1 to 3 inches. We have found that spacing 145 for the tack welds 144 of about 2 inches works quite well.

Again, the heating surface 148 of the soldering iron is placed between the sides of the rope 140 and 141 until the polymeric material begins to melt at fusion temperature at which point the soldering iron is removed and the two pieces of rope are held together forming a tack weld 144. By spacing the distance between the tack welds to form spaces 145 the rope 141 forms a series of loops 146 which, of course, are under no tension and thus will not be squeezed of herbicide as the drive rope 140 traverses the sheaves.

It has been noted that as the drive rope enters the groove of the sheaves the loops 146 tend to extend laterally so that there has been no problem with the loops being caught up in the sheaves in the device.

By the addition of the second endless rope, the carrying capacity of herbicide for the application to weed is effectively doubled as is the wiping surface of the rope assembly formed by endless rope 140 and 141.

The actual drive mechanism utilized is best shown in FIG. 4 and consists of a sprocket 150 over which chain 152 is trained and is connected to motor 155 supported on motor support 156. In this case, since two pairs of endless ropes are utilized, the two drive drums A are driven by the same sprocket 150 (through a coupling not shown) and the two idler drums are driven by the drive ropes 141 in the direction indicated on the drawings.

The speed of the ropes 140 and 141 should be in the range of 10 to 20 lineal feet per minute. The speed should not be so fast so that the ropes act as a pump to pump the liquid herbicide out of the immersion basin 40. On the other hand, the speed should be fast enough that the ropes 140 and 141 acting as the herbicide applicator is wet both on the incoming and the outgoing side. We have found that a preferable speed is about 15 lineal feet per minute.

We have also found that nylon braided rope works well in this application. There is some stretching, but this can be compensated for by use of the telescopic end piece 101 previously described in the application.

The constantly moving ropes 140 and 141 which change direction passing around the distally mounted sheaves 107 forms an applicator moving in both directions to and from the medially disposed drums to the distally disposed sheaves and serves as a constant supply of liquid herbicide in wiping engagement with the vertically standing weeds.

As previously mentioned, the weeds have a normal quick initial growth so that they are taller than the desirable crops and therefore the boom can be disposed at a level so as to engage the weeds and not the plants. The triangular weed bender in the front of the apparatus tends to bend the weeds laterally into engagement with the wetted ropes 140 and 141 and the coil spring snubber 121 tends to adequately protect the extended boom B from undue vibration during movement across the fields.

The boom can be adjusted to a proper height so that the weed killer can be wipingly engaged with the weeds through the wetted rope without engagement of the herbicide with the desirable plants. The boom can be adjusted by means of the hydraulic cylinder and the piston to various levels within the field or the entire assembly can be raised or lowered on the vertical standard 25 by engagement of the bolts through another set of bolt holes.

Many modifications will occur to those persons skilled in the art from the detailed description hereinabove given which is meant to be exemplary in nature and non-limiting except so as to be commensurate in scope with the appended claims.

We claim:

1. A liquid herbicide applicator for the selective application of herbicide to undesirable weeds, said applicator to be supported by a tractor, and which comprises in combination:
   A. a centrally located supporting frame work attached to said tractor,
   B. a tank associated with said frame work for holding a supply of liquid herbicide,
   C. an immersion basin in operative relation with said tank for provision of a shallow liquid level of herbicide,
   D. a boom supported by said frame work and extending laterally on each side thereof,
   E. height adjustment means for adjusting the height of the boom relative to the crop to be treated,
   F. a pair of distally mounted sheaves,
      1. one each of said distally mounted sheaves being journalled at opposite ends of said boom,
   G. a pair of medially mounted drums,
      1. said pair of medially mounted drums being journalled directly over said immersion basin and extending down toward the bottom of said basin,
   H. a first endless rope trained over each sheave of said pair of distally mounted sheaves and over and around each drum of said pair of medially mounted drums so that said rope is immersed in said liquid and wetted with herbicide upon every revolution of said medially mounted drums,
      1. said endless rope, being fabricated of polymeric material and having been formed by application of heat to the free ends of the precursor of said endless rope, until the polymeric material of said free ends reaches fusion temperature and thereafter welding the melted material of said free ends together;
   I. means for driving at least one of said drums, so as to drive the wetted rope trained over said sheaves and in wiping engagement with the undesirable weeds.

2. A liquid herbicide applicator, as defined in claim 1, the further improvement of:
   A. a second endless rope fabricated of polymeric material and formed by welding the free ends of the precursor of said endless rope together;
   B. said second endless rope being tack-welded at spaced intervals to the external surface of the outer circumference of said first endless rope by application of heat to the external surface of both ropes until the fusion temperature is reached and the two ropes are welded together; to form a continuous serpentine pattern comprising a series of loops of said second rope, each of said loops extending between tack welds with said first rope.

3. A liquid herbicide applicator, as defined in claim 2, in which said second rope is under no tension.

4. A liquid herbicide applicator, as defined in claim 2, in which said second rope is first tack welded at spaced intervals to the external surface of said first rope and thereafter the free ends of the precursor of said second rope are subjected to sufficient heat to melt the polymeric material and the free ends are pushed together to form a weld of the polymeric material.

5. For use with a boom, extending laterally from a tractor, a liquid herbicide applicator for selectively applying herbicide to upstanding weeds by wiping engagement therewith, which comprises:
- A. a pair of distally mounted sheaves journalled at opposite ends of said boom;
- B. a first endless rope trained over said distally mounted sheaves,
  1. said endless rope being fabricated of polymeric material and having been formed by application of heat to the free ends of the precursor of said endless rope until the polymeric material of said free ends reaches fusion temperature and thereafter welding the melted material of said free ends together; and
- C. means for driving said rope around said distally mounted sheaves;
- D. means for continually wetting said rope with said liquid herbicide.

6. A liquid herbicide applicator, as defined in claim 5, the further improvement of:
- A. a second endless rope fabricated of polymeric material and which has been formed by welding the free ends of the precursor of said endless rope together;
- B. said second endless rope being welded at spaced intervals to the external surface of the outer circumference of said first rope by application of heat to the external surface of both ropes until the fusion temperature of the polymeric material is reached, and thereafter bringing the melted surfaces of said two ropes together to form a tack weld and a continuous serpentine pattern comprising a series of loops of said second rope, each of said loops extending between tack welds with said first rope.

7. A liquid herbicide applicator, as defined in claim 6, in which said second rope is under essentially no tension.

8. A liquid herbicide applicator, as defined in claim 6, in which the external surfaces of said first and second ropes are tack welded together at spaced intervals and thereafter the free ends of the second rope are subjected to sufficient heat to melt the polymeric material and the two free ends containing the melted polymeric material are brought together to form a permanent weld.

9. A method of selectively applying liquid herbicide to unwanted vegetation in a field of existing crop, which comprises the steps of:
- A. continuously wetting a portion of a first endless rope trained over a pair of distally journalled sheaves with a liquid herbicide;
  1. said endless rope being fabricated of polymeric material and having been formed by application of heat to the free ends of the precursor of said endless rope until the polymeric material of said free ends reaches fusion temperature and thereafter bringing the free ends of said precursor of said endless rope together so that the melted polymeric material of said free ends forms a weld;
- B. driving the wetted endless rope at a low rate of linear speed in a path spanning both sides of said sheaves;
- C. elevating said wetted rope spanning said distally journalled sheaves to a height above said crop but in wiping engagement with said unwanted vegetation; and
- D. moving said endless rope in said distally journalled sheaves in a path perpendicular to the line of travel of said wetted rope.

10. A method of selectively applying liquid herbicide, as defined in claim 9, the further improvement of:
- A. a second endless rope fabricated of polymeric material formed by welding the free ends of the precursor of said endless rope together;
- B. said second endless rope being tack-welded at spaced intervals to the external surface of the outer circumference of said first rope by application of heat to the external surface of both ropes until the fusion temperature of the polymeric material is reached and the melted polymeric material of both ropes are brought together to form a weld and a continuous serpentine pattern, comprising a series of loops of said second rope, each of said loops extending between tack welds with said first rope.

11. A method of selectively applying liquid herbicide, as defined in claim 10, in which said second rope is tack-welded to the external surface of the outer circumference of said first endless rope at spaced intervals to form said endless serpentine pattern and thereafter the free ends of said second rope are subjected to sufficient heat to bring the polymeric material to fusion temperature and thereafter the free ends of the second rope are brought together to form a weld.

12. An endless rope fabricated of polymeric material which has been formed by application of heat to the free ends of the precursor of said endless rope until the polymeric material of said free ends is brought up to fusion temperature, and thereafter the free ends of said precursor of said endless rope are brought together, so that the melted material of said free ends forms a weld; the improvement therewith of a second rope, tack-welded at spaced intervals to the outer circumference of said first endless rope by application of heat to the external surfaces of both ropes until the polymeric material is brought to temperature and thereafter the external surfaces of the two ropes are brought together, so that the melted polymeric material forms a tack weld and a continuous serpentine pattern comprising a series of loops of said second rope, in which each loop extends between tack welds with said first rope.

13. An endless rope assembly, as defined in claim 12, in which said second rope is formed into an endless rope by heating the free ends of said precursor of said second rope until the polymeric material is melted at fusion temperature and thereafter the free ends are brought together so that the melted polymeric material of said free ends form a permanent weld.

14. The method of forming an endless rope assembly, which includes the steps of:
- A. heating the free ends of a first rope until the polymeric material is melted at fusion temperature;
- B. removing the source of heat from the free ends of said rope;
- C. pressing the free ends of said first rope together so that the melted polymeric material forms a weld;
- D. tack-welding a second rope at spaced intervals to the outer circumference of said first rope which comprises the steps of:
  1. applying a source of heat to the external surfaces of both ropes,
  2. bringing the external surface of both ropes up to fusion temperature to form a melted polymeric material,
  3. removing the source of heat,
  4. bringing the external surfaces of both ropes together and forming a weld of the melted polymeric material of the external surface of both ropes and 5. forming a serpentine pattern comprising a series of loops of said second rope, each loop extending between welds of said second rope to the other circumference of said first rope.

15. The method of forming an endless rope assembly, as defined in claim 14, the further improvement of:

A. bringing the free ends of said second rope into contact with a source of heat,
B. melting the polymeric material of the free ends,
C. removing the heat source,
D. bringing the free ends of the second rope together, and
E. forming a weld of the melted polymeric material.

* * * * *